Aug. 28, 1923.

C. W. LARNER 1,466,130

VALVE

Filed April 29, 1919 4 Sheets-Sheet 1

WITNESS:
Rob. R. Kitchel.

INVENTOR
Chester W. Larner
BY
Augustus B. Stoughton
ATTORNEY.

Aug. 28, 1923.

C. W. LARNER

VALVE

Filed April 29, 1919 4 Sheets-Sheet 3

1,466,130

Patented Aug. 28, 1923.

1,466,130

UNITED STATES PATENT OFFICE.

CHESTER W. LARNER, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

VALVE.

Application filed April 29, 1919. Serial No. 293,476.

*To all whom it may concern:*

Be it known that I, CHESTER W. LARNER, a citizen of the United States, and a resident of Philadelphia, in the county of Philadelphia and State of Pennsylvania, have invented certain new and useful Improvements in Valves, of which the following is a specification.

This invention relates to control means for valves and particularly to fluid pressure operated plunger valves controlling the flow in a distributing system sometimes handling a large quantity of fluid and often under great pressure.

The principal object of the invention is to provide means for the controlling of large valves of this type by hand or by light and easily operated mechanical or electrical apparatus so that the pressure of the distributing system may be quickly and readily applied to move the main valve open or closed as desired under any condition met with in practice and whether the fluid is still or flowing.

A further object of the invention is to simplify the operation of the control so as to completely govern the main valve by selective movements of a control means easily actuated by a single operator and adapted to be most advantageously placed in the installation.

A further object of the invention is to provide protection to the distributing system against a break of the piping or other accident and for this purpose an auxiliary automatic control is so combined with the main control that any excessive drop in pressure such as would be occasioned by such an accident will cause the control means to automatically operate itself and shut the main valve. This automatic stoppage of the flow is particularly important in that it is just at time of emergency that the human element is least dependable and the conditions often render it difficult and dangerous for the operator to remain at his post.

In the accompanying drawings

Figure 1:
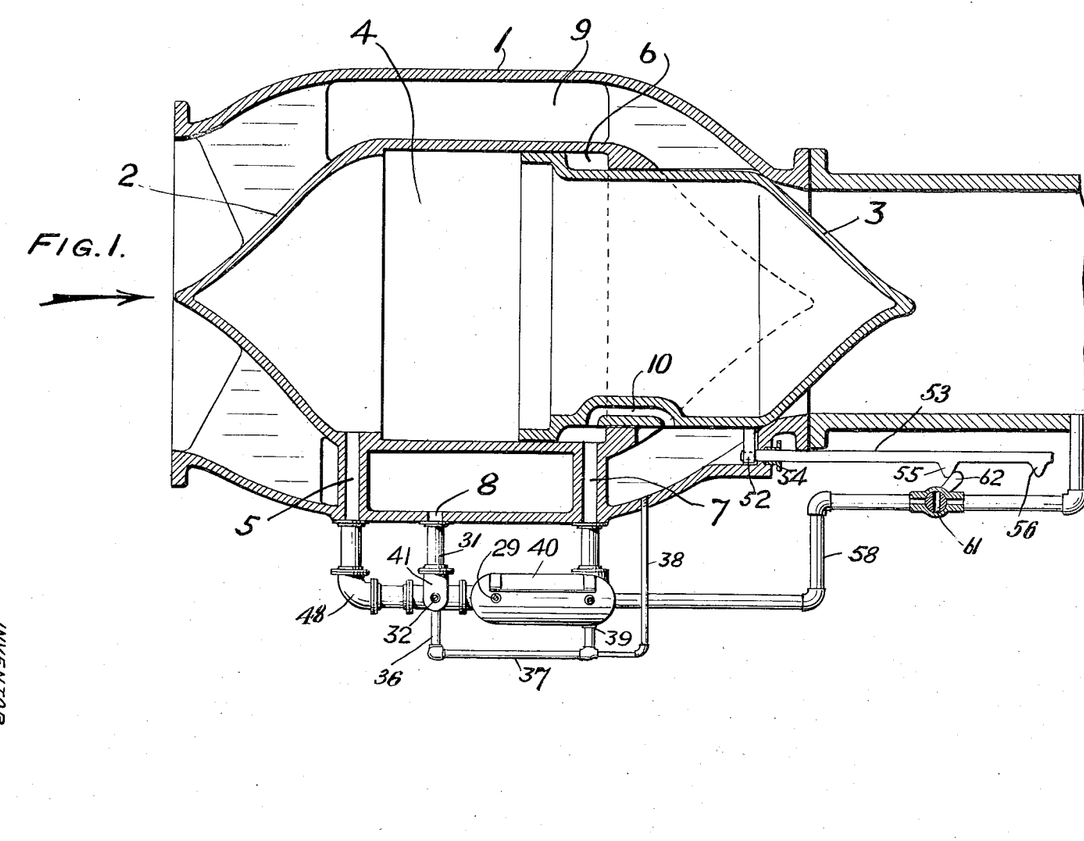
Figure 1, is a longitudinal cross section of a valve and control mechanism embodying one form of my invention.

Referring to Figure 1, the numeral 1, represents a valve body or housing which may be an enlargement of a conduit or pipe line for fluids under pressure; 2 and 3, are respectively, the fixed and telescopic plunger valve elements, the latter being afforded a seat, as is usual, on the wall of the valve body at the small end or neck thereof, and having its downstream end in conical or reverse curve form.

It will be noted that the chambered part of plunger 3, is fully open to communication with, or is co-extensive with, the chambered part of fixed unit 2, so that there is formed a cylindrical chamber 4, which is connected by means of port 5, to the control mechanism. Plunger 3, is decreased in diameter throughout a portion of its length thereby forming an annular chamber 6. This annular chamber 6, is connected directly to the control mechanism by means of a port 7. A port 8, is provided in the valve housing 1, and is connected directly to the control mechanism thereby providing a source of fluid pressure supply to the control mechanism. The annular chamber 6, is connected directly to the main fluid passage 9, when the valve plunger 3, is in the closed position, by means of port 10.

This differential construction of the valve chambers enables the valve 3, to be both opened and closed by the main line pressure under all conditions of pressure met with in practice and regardless of whether the fluid is still or flowing. To open the valve from the closed position shown in Figure 1, port 5, is opened by the control means to exhaust fluid from chamber 4, and reduce the pressure therein; port 7, is held closed by the control means and main line pressure is at first maintained in chamber 6, by passage 10, to initially draw valve 3, from its seat, any pressure on the face of the valve of course aiding in this opening. As the valve 3 moves back the port 10 closes but leakage around the plunger supplies fluid to the chamber 6, and this and the pressure on the nose of the opening valve forces the valve back to its full open position, indicated in dotted lines, and holds it there.

In closing the valve the control mechanism opens port 7, to the exhaust to reduce the pressure in chamber 6, and at the same time the control mechanism connects port 8 to port 5, to raise the pressure in chamber 4.

Figure 2:
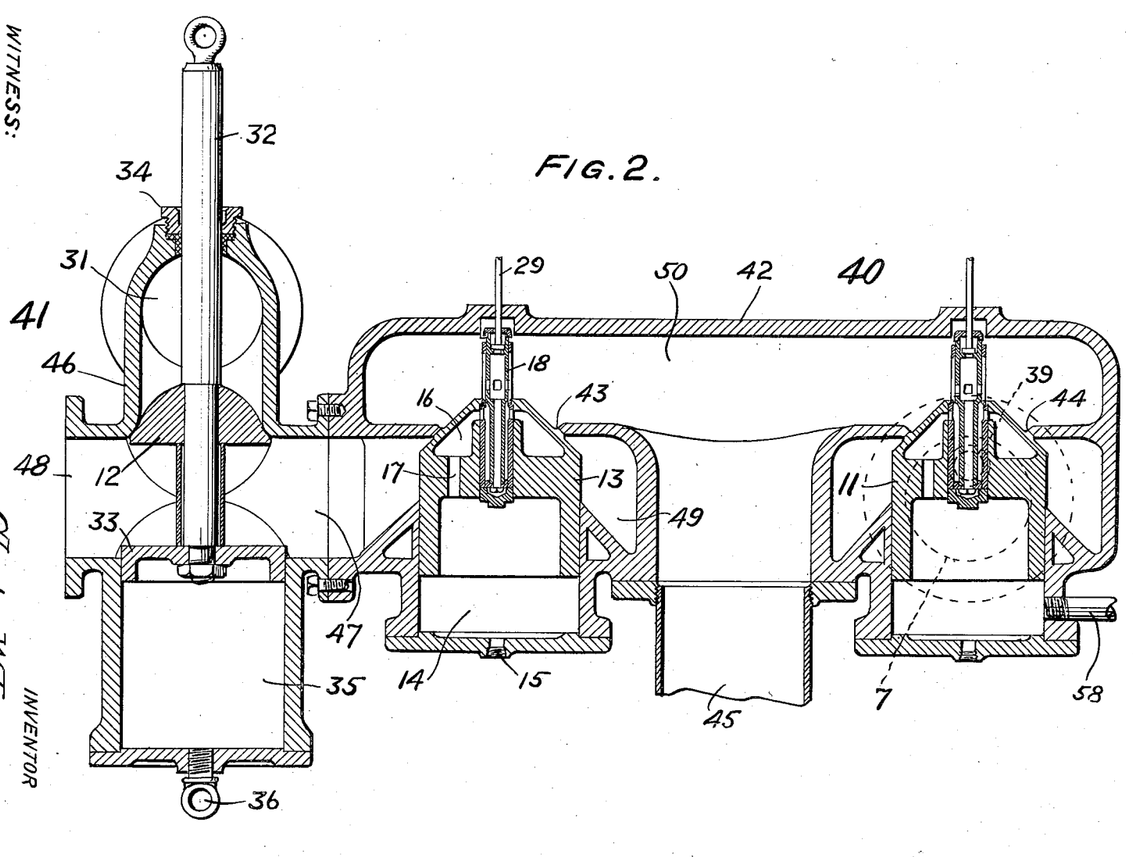
Fig. 2, is an elevational view, principally in section, drawn to an enlarged scale and illustrating the control mechanism.
Figure 3:
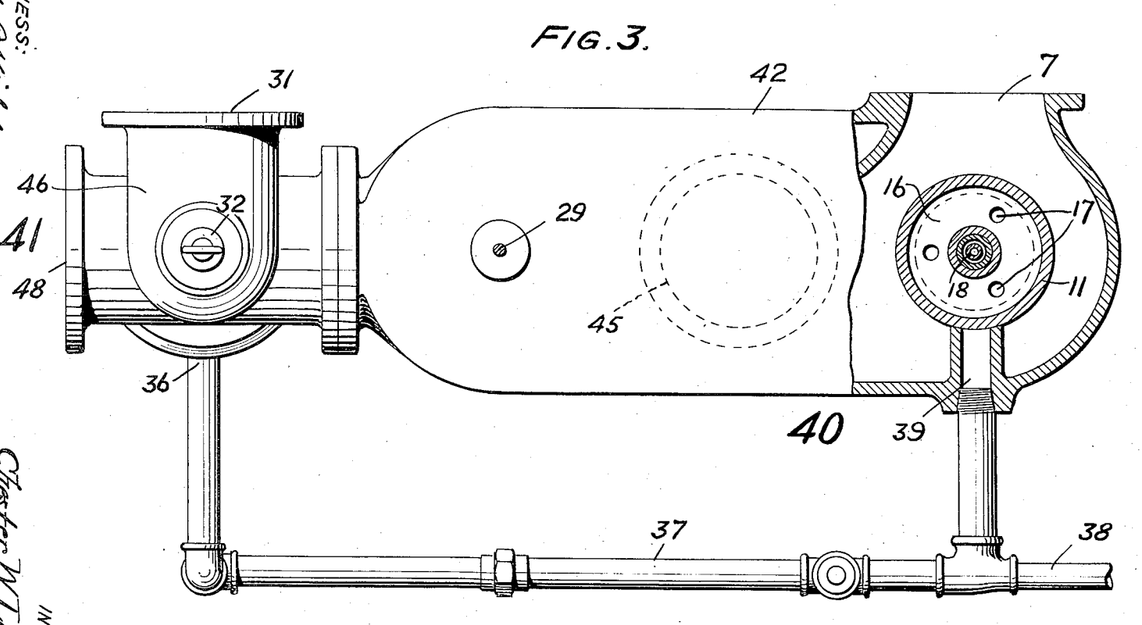
Fig. 3, is a top or plan view, partly in section, of the same.
Figure 4:
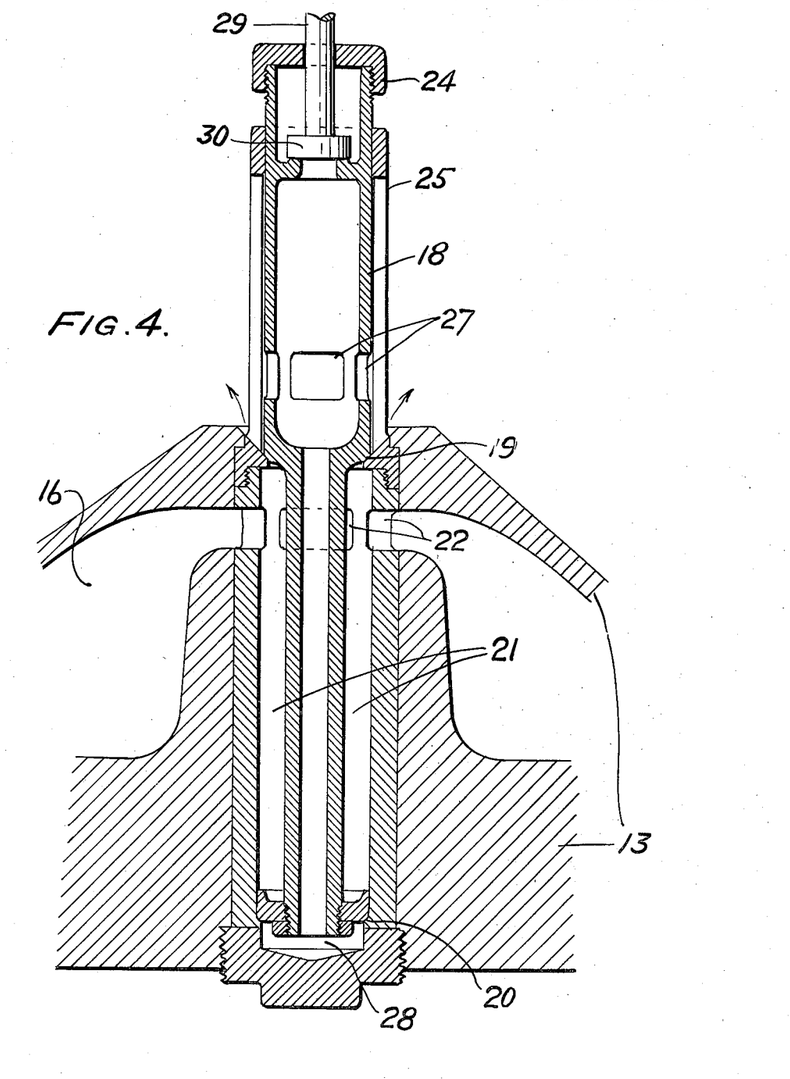
Fig. 4, is a cross section in elevation drawn to an enlarged scale, and further illustrating the control mechanism.

Figures 2, 3 and 4, show details of control mechanism 40 and 41, which are shown in Figure 1, in outline only.

Control mechanism 40, consists of a body 42, having two inlets 43 and 44, and an outlet 45, to the atmosphere, the connection between the inlets and the outlet being controlled by two relay valves 13 and 11. Relay valve 11, controls the connection between inlet 44 and outlet 45. Inlet 44, leads to chamber 6, of the valve and, since the plunger 3, is closed by exhausting the chamber 6, to the atmosphere, it will be seen that the closing movement of plunger 3, is controlled by relay valve 11.

Relay valve 13, controls the connection between inlet 43 and outlet 45. Inlet 43, leads to chamber 4, of the Johnson valve and, since plunger 3, is opened by exhausting chamber 4, to the atmosphere, it will be seen that the open-movement of plunger 3, is controlled by relay valve 13.

Control mechanism 41 consists of a body 46, having an inlet 31, and two outlets 47 and 48. The connection between the inlet and the outlets is controlled by valve disc 12. Inlet 31, leads to port 8, in the Johnson valve body and outlet 48 leads to chamber 4 of the Johnson valve. It will be seen, therefore, that when valve disc 12, is opened, pipe line pressure from main fluid passage 9, is admitted to chamber 4. In order to close plunger 3, it is necessary to admit pressure to chamber 4, at the same time it is discharged from chamber 6, and therefore, valve disc 12, is arranged to open automatically at the same time that relay valve 11, is opened. When relay valve 11, closes, valve disc 12, closes and remains closed under all other conditions. Outlet 47, in conjunction with outlet 48, forms a passage in body 46, through which the pressure in chamber 4, is discharged to the atmosphere when relay valve 13, opens. There is never any flow from inlet 31, through outlet 47, because valve disc 12, is never open when relay valve 13, is open.

Relay valves 11 and 13, are designed for operation by any suitable means, such as hand, electricity, steam, compressed air, etc., in the following manner, description of which refers to only relay valve 13, since both relay valves are identical in construction.

Relay valve 13, consists of a cylindrical plunger with a conically shaped top which is closed against a seat ring in body 42. The relay valve is contained in a cylindrical chamber 14, formed in body 42. An annular chamber 49, formed with inlet 43, surrounds relay valve 13, and when the latter is open, discharges into chamber 50, which is exhausted to the atmosphere through outlet 45. A chamber 16, is located inside relay valve 13, and is connected to chamber 14, by means of ports 17. A pilot valve shown in detail in Figure 4, is located centrally in relay valve 13, and controls the connection between chamber 16, and the exhaust to atmosphere through outlet 45. Chamber 14, is connected directly at port 15, to a source of pipe line pressure such as main fluid passage 9, Figure 1. A portion of conical top of relay valve 13, is subjected to pipe line pressure existing in chamber 49, producing a downward force which, when the pilot valve is closed, is overcome by the upward force due to pipe line pressure in chamber 14, thus holding relay valve 13, closed. Ports 17, and corresponding passages through the pilot valve to exhaust are larger in area than port 15. It will, therefore, be easily understood that the opening of the pilot valve will result in a drop in pressure in chamber 14. The existing pipe line pressure on portion of conical top of relay valve 13, together with weight of relay valve, will then cause the relay valve to open.

Closing the pilot valve will stop the discharge of pressure from chamber 16, and allow pipe line pressure to be re-established in chamber 14, through port 15. Relay valve 13, will therefore close.

Referring to Figure 4, the pilot valve above referred to is shown in detail. It consists of a hollow plunger 18 which is ground to fit two fixed valve seats 19 and 20. Chamber 21 is connected directly to chamber 16 through ports 22. When plunger 18 is down or in the closed position, chamber 21 is subjected to pipe line pressure which is admitted through ports 22. The area at valve seat 20 is slightly larger than the area at valve seat 19. This results in an unbalanced condition which keeps plunger 18 closed.

Plunger 18 extends above valve seat 19 and has a cap 24 at the top. Valve seat 19 is extended to form a cylindrical guide 25 for the upper end of plunger 18.

Open ports 27 are provided in plunger 18 and serve to maintain atmospheric pressure in chamber 28 below plunger 18. A valve stem 29 with a head 30 is located at the top of plunger 18. This valve stem 29 extends through cap 24 and is used to raise or lower plunger 18. The valve stem may be operated by hand or by any other means, such as an electric magnet.

To open relay valve 13, valve stem 29 is pulled up. Plunger 18 remains closed until head 30 of valve stem strikes cap 24, thereby unseating plunger 18. A continuation of the upward movement of valve stem 29 raises plunger 18 and allows pressure to be exhausted from chamber 16 through ports 22 and through openings in cylindrical guide 25 to chamber 50. The exhaust of pressure from chamber 16 serves to lower pressure in chamber 14 and relay valve 13 will open as previously described. The plunger 18 is held in the up, or open, position until it is desired to close the relay valve, when plunger 18 is released.

To close relay valve 13 the upward pull on valve stem 29 is released. In case of electric magnet operation the circuit is broken cutting off the force which was holding up valve stem 29. Plunger 18 will now close due to its own weight and to unbalanced condition in chamber 21 previously described. The re-seating of plunger 18 at point 19 will cut off the exhaust of pressure from chamber 16 and relay valve 13 will close as previously described.

Valve disc 12 is operated automatically and synchronously with relay valve 11. Inset 31 is connected directly to valve housing 1 at port 8, Figure 1, thereby being subjected to pipe line pressure existing in passage 9, Figure 1. Valve disc 12 is fastened rigidly to valve stem 32. Valve piston 33 is also fastened rigidly to valve stem 32. Valve stem 32 extends above valve disc 12 through inlet 31, through stuffing box 34 and thence to an exterior position above stuffing box 34. Chamber 35 below piston 33 is connected directly to valve housing 1, Figure 1, through connection 36 and piping 37 and 38.

Inlet 31 and chamber 35 being connected directly to valve housing 1, Figure 1, are subjected to the same pressure. Under these conditions valve disc 12 will remain in the closed position by virtue of the exposed area of valve stem 32 which is under atmospheric pressure.

A port 39 is shown connecting to piping 37 which is so located in elevation that when relay valve 11 is closed, port 39 is closed and when relay valuve 11 is open, port 39 is open and discharging under atmospheric pressure. Piping 38 is smaller in area than piping 37 and port 39.

So long as relay valve 11 is in the upper or closed position, port 39 is cut off and full pipe line pressure is maintained in chamber 35 through piping 37 and 38. When relay valve 11 is lowered or opened, port 39 is open to exhaust and a drop in fluid pressure takes place in chamber 35, through piping 37, and port 39. Piping 38, being smaller in area than piping 37 and port 39, the transmission of fluid pressure through piping 38, will not prevent the drop in fluid pressure in chamber 35. Valve disc 12, will now be lowered or opened on account of pipe line pressure existing in inlet 31, and a relatively low pressure existing in chamber 35.

The raising or closing of relay valve 11, cuts off port 39, and allows pipe line pressure to be re-established in chamber 35, through piping 37 and 38. The restoring of pipe line pressure in chamber 35, results in valve disc 12, being raised or closed.

This control means enables the valve 3, to be opened or closed by simple alternative movements of the stems 29, all the rest of the operation of the valve control means being entirely automatic. Combined with this automatic control of the valve is an automatic safety control mechanism illustrated in Fig. 1. This safety mechanism actuates the control mechanism to close the valve 3, upon any excessive drop in pressure in the pipe main or distributing system below the valve and the means employed are operative without disturbing the pilot valve and even without the pilot valve.

As shown in Fig. 2, piping 58, is connected at one end to the control mechanism 40, at the cylinder below valve 11, and at the other end, it will be connected to any suitable point or points in the system. A drop in pipe line pressure at such point or points from a break or other accident will be transmitted by pipe 58, to the chamber below valve 11, and will automatically have the same effect in opening this valve and valve 12, to close the main valve 3, as the lifting of the corresponding pilot valve would have. In this way the fluid supply will be automatically shut off without the interposition of the operator at any point.

In order to prevent leakage from the control mechanism in the system beyond the main valve when the latter is closed and insure the operation of the safety mechanism whenever the main valve is open, the piping 58, is preferably automatically closed by the closing of the main valve and opened by the opening of the main valve. For this purpose a projection 52, is rigidly secured to plunger 3, and has fastened to it a rod 53, passing through a stuffing box 54, in the main valve housing. Rod 53, extends beyond the main valve housing and has attached thereto two projections 55 and 56, on opposite sides of handle 62, on control valve 51, in piping 58. When the main valve 3, is closed the projection 55, will engage the handle 62, to close the valve 61, and when the main valve 3, is open, the projection 66, will move the handle 62, to open valve 61, and maintain it open so that the safety closing mechanism is automatically connected and maintained in operation.

I claim:

1. Means for controlling the operation of pressure operated valves comprising the combination of fixed and movable valve elements having a closing and an opening pressure operating chamber for operating the movable elements, an unbalanced relay valve normally held in closed position by the application of pipe line pressure and operatable to exhaust pressure from the closing operating chamber, an unbalanced relay valve normally held in closed position by the application of pipe line pressure and operatable to exhaust pressure from the opening operating chamber, an admission valve formed by the fixed and movable elements of the valve for admission of pressure from the system to the opening operating chamber, an unbalanced admission valve normally held in closed position by the application of pipe line pressure and operatable to admit pressure to the closing operating chamber, a line pressure connection to the last named admission valve and a connection therefrom to the second named relay valve whereby said relay and admission valves are opened and closed in unison, and unbalanced pilot valves normally held in closed position by the application of pipe line pressure and operatable to open the relay valves by reducing the closing pressure on the relay valves.

2. Means for controlling the operation of pressure operated valves, comprising the combination of fixed and movable valve elements embodying operating chambers for operating the valve, and whereof one chamber is provided with an admission slide valve, a pressure operated normally closed admission valve for the other of said chambers, pressure operated normally closed relay valves for exhausting said chambers, a pressure connection from one of said relay valves to the pressure admission valve to work said valves in unison, and pressure closed exhaust pilot valves operatable when opened to unbalance the pressure on the relay valves and open them.

3. Means for controlling the operation of pressure operated valves, comprising the combination of fixed and movable valve elements embodying operating chambers for operating the valve, an admission valve for one of said chambers operatable by the movement of the plunger, a pressure operated normally closed admission valve for the other of said chambers, pressure operated normally closed relay valves for exhausting said chambers, and pressure closed exhaust pilot valves operatable when opened to unbalance the pressure on the relay valves and open them.

4. Means for controlling the operation of pressure operated valves, comprising the combination of fixed and movable valve elements embodying operating chambers for operating the valve and whereof one chamber is provided with an admission slide valve, a pressure operated normally closed admission valve for the other of said chambers, pressure operated normally closed relay valves for exhausting said chambers and pressure closed exhaust pilot valves operatable when open to unbalance the pressure on the relay valves and open them.

5. In means for controlling the operation of pressure operated valves the combination of a casing body having openings for connection to line pressure, to each of the operating chambers of the valve and to exhaust; relay valve chambers provided with pressure inlets, unbalanced piston relay valves having exhaust openings through them an arranged in said chambers and operated by change of pressure therein, pilot valves for controlling the openings through the relay valves, an admission valve piston chamber in said body, an unbalanced admission valve and its operating piston in the last mentioned chamber, the said admission valve controlling the admission of pipe line pressure to the cylindrical operating chamber of the valve, substantially as described.

6. In means for controlling the operation of pressure operated valves the combination of fixed and movable valve elements embodying cylindrical and annular operating chambers, a casing body having a valve mounted therein for exhausting pressure from said annular chamber and having a seat for said valve, a valve and a complemental seat in the casing for admitting pressure to said cylindrical chamber said last mentioned two valves being separate structures, and means whereby the last two named valves are seated and unseated in unison, substantially as described.

7. In means for controlling the operation of pressure operated valves, the combination of fixed and movable valve elements embodying operating chambers, separate admission and exhaust valves for each chamber and their connections thereto and power means for operating each of said four valves in co-ordination, substantially as described.

8. In means for controlling the operation of pressure operated valves the combination of fixed and movable valve elements forming a plunger adapted to be moved in either direction by fluid pressure, pressure operated admission and exhaust relay valves for operating said plunger, and self-closing pilot valves fluid pressure operated in one direction for controlling the relay valves.

9. In means for controlling the operation of pressure operated valves the combination of fixed and movable valve elements to form a cylindrical and an annular operating chamber, and means whereby line pressure is admitted to the annular chamber at the beginning of the opening stroke of said movable element and cut off later in the stroke by the movement of said element.

10. The combination of a conduit, a valve seat and a hollow telescoping valve in the conduit, the movable section of the valve having reverse curves, and the said elements being arranged to form a cylindrical and an annular operating chamber, and means whereby line pressure is admitted to the annular chamber at the beginning of the opening stroke of said movable element and cut off later in the stroke by the movement of said element, and is cut off from said annular chamber at the beginning of the closing stroke of said movable element and admitted thereto later in the stroke by the movement of said element.

11. The combination of a conduit, a valve seat and a hollow telescoping valve in the conduit, the movable section of the valve having reverse curves, means for applying the pressure of the fluid in the conduit to opposite sides of the movable section to open and close the valve, and automatic means for slowing down the movable element as it approaches the seat in the closing movement of the valve.

12. The combination of a conduit, a valve seat and a hollow telescoping valve in the conduit, the movable section of the valve having reverse curves, means for applying the pressure of the fluid in the conduit to opposite sides of the movable section to open and close the valve, and automatic means for slowing down the movable element as it approaches the end of its stroke in each direction.

13. The combination of a conduit, a valve seat and a hollow telescoping valve in the conduit, the movable section of the valve having reverse curves, means for applying the pressure of the fluid in the conduit to opposite sides of the movable section to open and close the valve, and means controlled by the movable section for regulating the application of the conduit pressure to said movable section so that the rate of movement thereof is reduced as it approaches its seat.

14. The combination of a conduit, a valve seat and a hollow telescoping valve in the conduit, the movable section of the valve having reverse curves, oppositely acting pressure chambers within said valve, passages for admitting fluid pressure to said chambers, and means controlled by the movable section, for throttling one of said passages as the movable section approaches one end of its stroke.

15. The combination of a conduit, a valve seat and a hollow telescoping valve in the conduit, the movable section of the valve having reverse curves, oppositely acting pressure chambers within said valve, passages for admitting fluid pressure from the conduit to said chambers, and means controlled by the movable section, for throttling the passage to one of the chambers as the movable section approaches the closing end of its stroke.

16. The combination of a conduit, a valve seat and a hollow telescoping valve in the conduit, the movable section of the valve having reverse curves, oppositely acting pressure chambers within said valve, passages for admitting fluid pressure from the conduit to said chambers, and automatic means for regulating the opening and closing movements of the valve at the different rates of speed.

17. The combination of a conduit, a valve seat and a hollow telescoping valve in the conduit, the movable section of the valve having reverse curves, oppositely acting pressure chambers within said valve, passages for admitting fluid pressure from the conduit to said chambers, and regulating means, operated by the movement of the movable section, whereby a quick opening and slow closing of the main valve are effected.

18. A mechanism for automatically closing valves of the type recited comprising the combination with the movable element of the valve of control mechanism responsive to drop in pressure for shifting the movable element of the valve into closed position, piping connecting the control mechanism to a point beyond the outlet end of the valve where a pressure drop due to leakage is felt, a valve in said piping, and connections between the movable element and the last named valve for operating the latter, substantially as described.

19. The combination of a conduit of fluid under pressure, of means for closing said conduit, comprising a casing in said conduit, a valve having a plunger in said casing adapted to be moved in either direction by fluid pressure, and means for applying the pressure of said fluid to said valve and plunger to close and open said valve by the pressure in said conduit, including means embodied in the plunger structure for automatically controlling pressure on said plunger by the movement of said plunger.

20. The combination with a valve adapted to move in a fluid under pressure, of means for opening and closing said valve by the pressure of said fluid comprising a valve plunger having a piston, a casing forming a cylinder for said piston, and means embodied in the plunger for automatically applying said fluid pressure to said plunger by the movement of said plunger.

21. The combination with a conduit for fluid under pressure, of a valve and valve casing in said conduit, a valve plunger in said casing, means for applying said conduit fluid pressure in one direction to close said valve, and means for applying said conduit fluid pressure in an opposite direction to open said valve and including means embodied in the plunger structure for automatically controlling the opening pressure by the movement of said plunger.

22. In mechanism for regulating the flow through a conduit the combination with a main valve having a piston member and fluid pressure chambers on opposite sides thereof adapted to be connected to conduit pressure, of control means for the fluid pressure to said chambers comprising auxiliary valve mechanism having separate piston chambers under conduit pressure, and means for selectively lowering the pressure in one or the other of said chambers to actuate said valve mechanism and move the main valve in desired direction by the pressure of the fluid in said conduit.

23. In mechanism for regulating the flow through a conduit the combination with a main valve having a piston member and fluid pressure chambers on opposite sides thereof adapted to be connected to conduit pressure, of control means for the fluid pressure to said chambers comprising auxiliary valve mechanism having separate piston chambers under conduit pressure, and means for selectively lowering the pressure in one or the other of said chambers to actuate said valve mechanism and move the main valve in desired direction by the pressure of the fluid in said conduit, said pressure lowering means comprising selectively operable pilot valves.

24. In a mechanism for controlling the flow through a conduit the combination with a main valve having a piston member and fluid pressure chambers on the opposite sides thereof, of control means for the fluid pressure to said chambers comprising a pair of separate auxiliary valves adapted to retain fluid pressure in said chambers and hold said main valve against movement, and control means for selectively actuating one or the other of said auxiliary valves to move said main valve.

25. In a mechanism for controlling the flow through a conduit the combination with a main valve having a piston member and fluid pressure chambers on the opposite sides thereof, of control means for the fluid pressure to said chambers comprising a pair of separate auxiliary valves adapted to retain fluid pressure in said chambers and hold said main valve against movement in any desired position, and control means for selectively actuating one or the other of said auxiliary valves to move said main valve to another position.

26. In a mechanism for controlling the flow through a conduit the combination with a main valve having a piston member and fluid pressure chambers on the opposite sides thereof, of control means for the fluid pressure to said chambers comprising a pair of separate auxiliary valves held closed under conduit pressure to retain fluid pressure in said chambers and hold said main valve against movement in any desired position, and control means for selectively actuating one or the other of said auxiliary valves to move said main valve to another position.

27. In a mechanism for controlling the flow through a conduit the combination with a main valve having a piston member and fluid pressure chambers on the opposite sides thereof, of control means for the fluid pressure to said chambers comprising a pair of separate auxiliary valves held closed under conduit pressure to retain fluid pressure in said chambers and hold said main valve against movement in any desired position, and control means for releasing the conduit pressure from one or the other of said auxiliary valves to open the corresponding auxiliary valve and move said main valve.

28. In a mechanism for controlling the flow through a conduit the combination with a main valve having a piston member and fluid pressure chambers on the opposite sides thereof, of control means for the fluid pressure to said chambers comprising a pair of separate auxiliary valves held closed under conduit pressure to retain fluid pressure in said chambers and hold said main valve against movement in any desired position, and control means for releasing the conduit pressure from one or the other of said auxiliary valves to open the corresponding auxiliary valve and move said main valve, said pressure releasing means comprising selectively operable pilot valves.

29. In mechanism for regulating the flow through a conduit the combination with a main valve having a piston member and fluid pressure chambers on opposite sides thereof adapted to be connected to conduit pressure, of control means for the fluid pressure to said chambers comprising auxiliary valve mechanism having separate piston chambers under conduit pressure, means for selectively lowering the pressure in one or the other of said chambers to actuate said valve mechanism and move the main valve in desired direction by the pressure of the fluid in said conduit, and means for automatically actuating said control means to close the main valve upon occurrence of an abnormal pressure in said conduit.

30. In combination with a device to be moved and two chambers in which differences of pressure are to be created to cause said device to be shifted in either direction, of a control mechanism including a valve body, with an exhaust chamber and with connections to both said first-named chambers, and said valve body having parts connected to a source of pressure and having connections by which pressure may be supplied to either chamber, and two valve units normally preventing exhaust of pressure from the first-named chambers, and means by which each valve unit may be moved to exhaust pressure from one chamber while it is being supplied to the other.

31. In combination with a device to be shifted, of a pair of chambers in which a difference in pressure is to be created to cause said device to be shifted in one direction or the other, of a control mechanism including a valve body with connections to both chambers and to a source of pressure, and a valve means adapted to be shifted to simultaneously reduce pressure in one chamber and supply pressure in the other chamber, and means for supplying pressure to the valve means to shift it in one direction, and exhausting pressure from the valve means to cause it to be shifted in the reverse direction.

32. In combination with a conduit having a hydraulic valve and a pair of chambers in which differences of pressure are adapted to be created to cause said valve to be closed and opened, of a control mechanism for said valve including a valve body with connections to both chambers for exhausting pressure therefrom, and with a connection to a source of supply of pressure, a valve means by which pressure is exhausted from one chamber and simultaneously supplied to the other, means whereby said valve means may be operated or controlled manually, and means whereby it may be operated automatically when a predetermined drop in pressure occurs beyond the valve.

CHESTER W. LARNER.